A. P. LEE.
DRAWBAR.
APPLICATION FILED APR. 12, 1919.
1,364,563.
Patented Jan. 4, 1921.
3 SHEETS—SHEET 1.
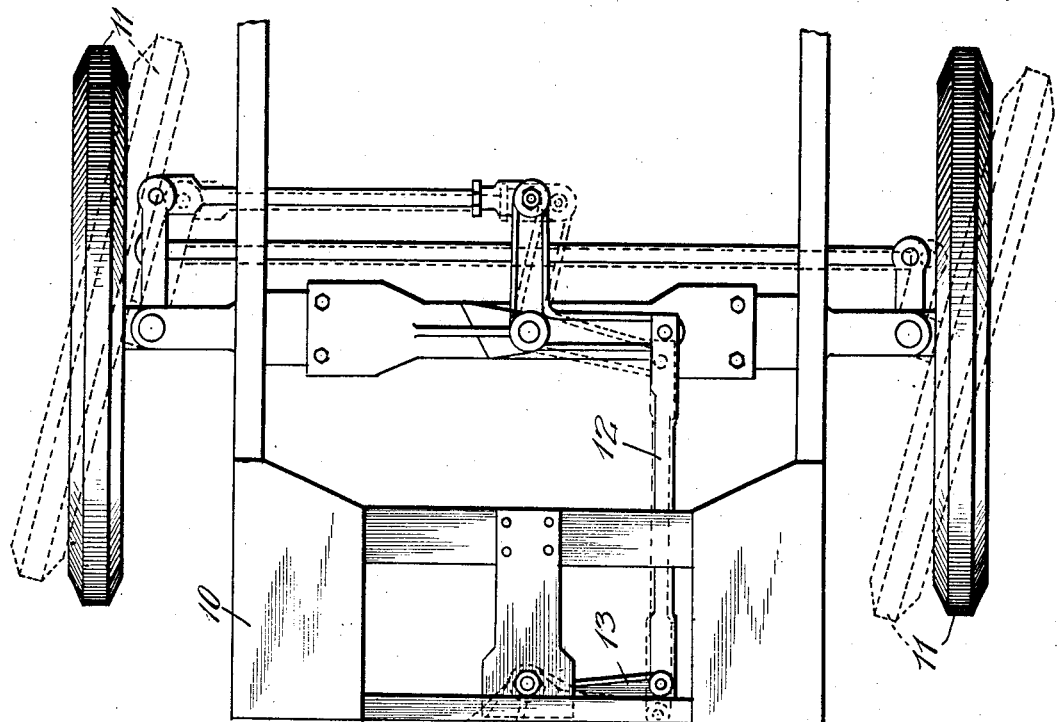
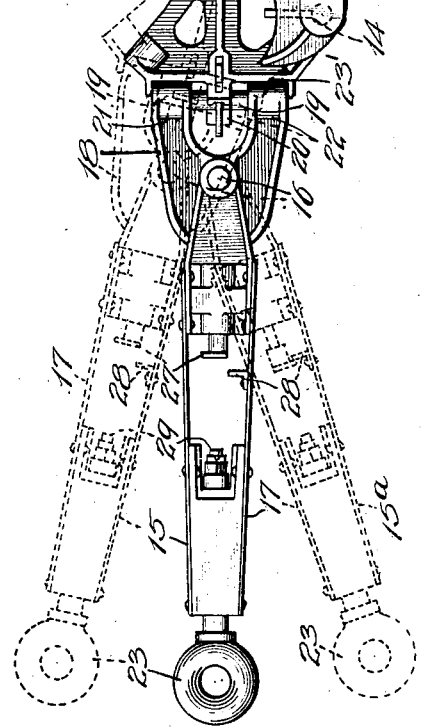
Witnesses:
W. T. Kilroy
Harry R. L. White
Inventor:
Albert P. Lee,
By Zabel & Mueller
Attys.

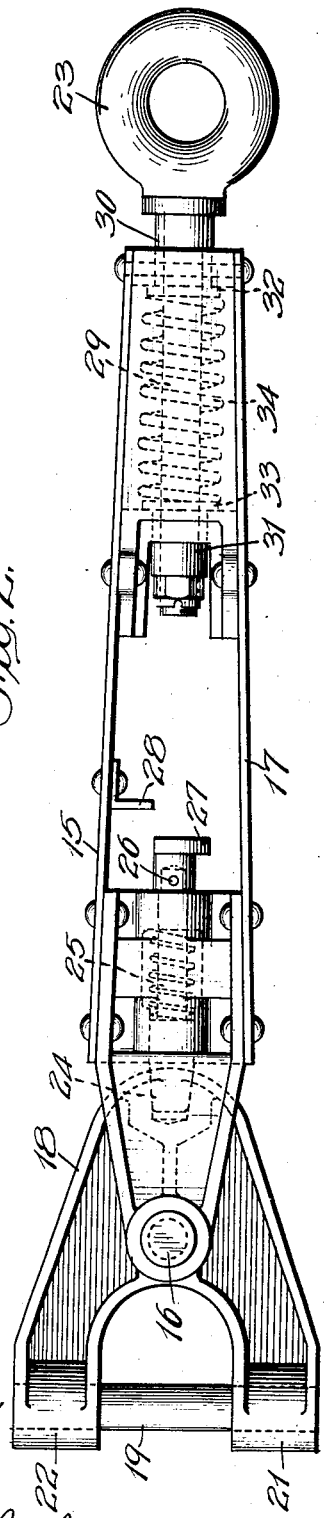
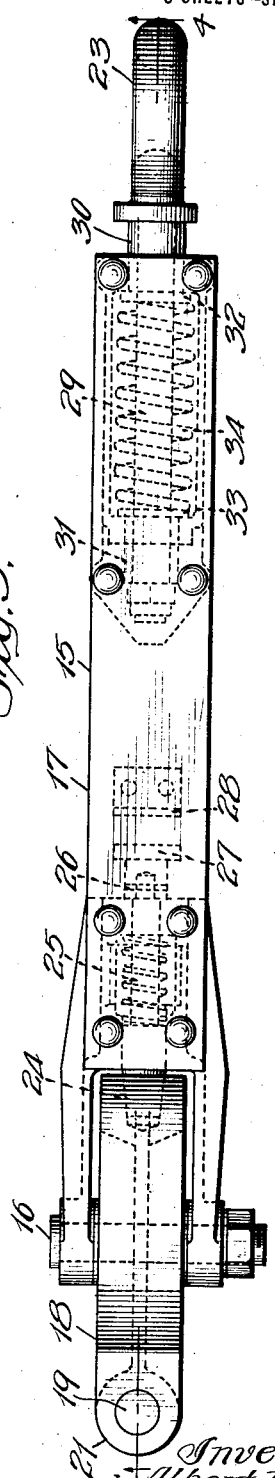

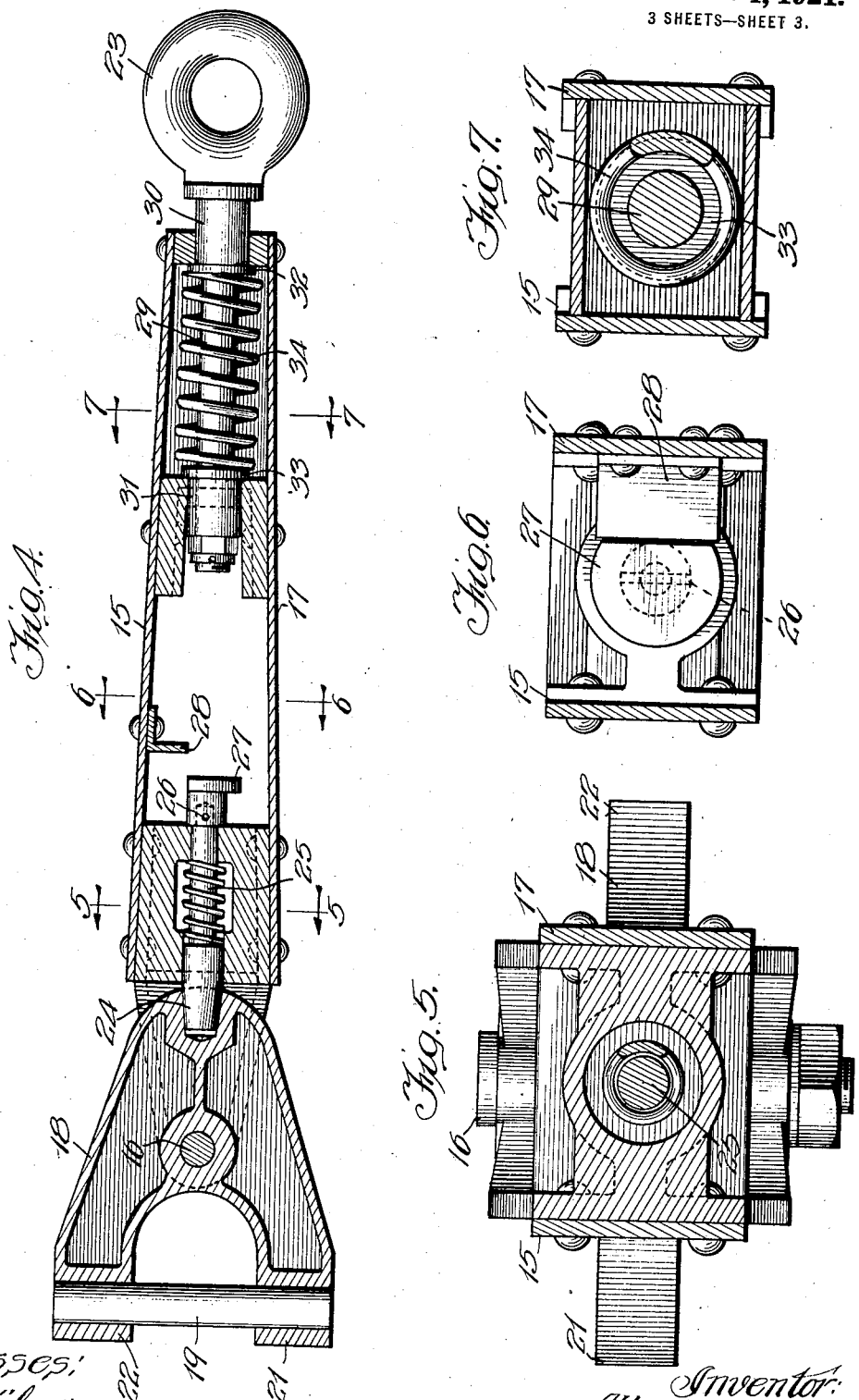

UNITED STATES PATENT OFFICE.

ALBERT PRESTON LEE, OF CHICAGO, ILLINOIS, ASSIGNOR TO LEE LOADER & BODY CO., OF CHICAGO, ILLINOIS.

DRAWBAR.

1,364,563.  Specification of Letters Patent.  Patented Jan. 4, 1921.

Application filed April 12, 1919. Serial No. 289,490.

*To all whom it may concern:*

Be it known that I, ALBERT P. LEE, a citizen of the United States, residing at Chicago, in the county of Cook and State of Illinois, have invented a certain new and useful Improvement in Drawbars, of which the following is a full, clear, concise, and exact description, reference being had to the accompanying drawings, forming a part of this specification.

My invention relates to drawbars for vehicles and is of particular use in connection with draw bars for uniting the various elements of vehicle trains.

I have found also that my improved draw bar is of particular utility for use between a pulling vehicle and a trailer.

In accordance with my invention I construct a draw bar in two sections pivotally united together end to end and provided with locking means at or adjacent their pivotal connection by virtue of which the two extremities of the draw bar may be locked together to form one rigid draw bar. When the locking means are unlocked, the two sections of the draw bar pivot one upon the other. The object of thus constructing the draw bar is to make the draw bar available not only when the trailer is being drawn forwardly, but also to make the draw bar available for use during the backing operation. The jointed feature of the draw bar is also of value when it is desired to connect a trailer to the pulling vehicle in those cases where the two vehicles are not absolutely alined, one behind the other. The improved draw bar of my invention is also so arranged at its opposite ends that the forward extremity of the draw bar may be attached to the rear head of the trailer in order to accommodate for a second trailer.

I will describe one particular form which my invention may take more in detail by referring to the accompanying drawings, in which—

Figure 1 is a fragmentary plan view of a trailer showing my improved draw bar in position;

Fig. 2 is an enlarged top view of the draw bar;

Fig. 3 is a side view thereof;

Fig. 4 is a sectional view on line 4—4 of Fig. 3;

Fig. 5 is a sectional view on line 5—5 of Fig. 4;

Fig. 6 is a sectional view on line 6—6 of Fig. 4, and

Fig. 7 is a sectional view on line 7—7 of Fig. 4.

Referring more particularly to Fig. 1, I show a trailer framework 10 having the front wheels 11, 11 which are suitably mounted for steering purposes so that they may be steered through the agency of the steering lever or link 12. This lever 12 is attached to a pivotally mounted head structure 13 carried by the framework of the trailer. Suitable locking means indicated by dotted lines at 14 and which are more clearly illustrated in my copending application Serial No. 289,489 filed April 12, 1919, serve to unite the pivotally mounted structure 13 rigidly with the truck framework or permit the free swinging thereof. My improved draw bar 15 is so constructed, as will presently appear, that it may be united with the head structure 13 in such a manner as to permit pivoting upon a horizontal axis, but prevent pivoting upon a vertical axis. Thus, if the draw bar 15 is mounted in position, as shown in Fig. 1, with the two parts of the draw bar locked together, as will presently appear, so as to form a rigid structure, then the swinging of the draw bar will swing the structure 13 to steer the wheels 11. When the structure 13 however is locked to the framework 10 of the trailer, then the draw bar is manipulated so that its two sections may pivot one upon the other, as shown in the dotted portion thereof at 15ª in Fig. 1. The forward portion of the draw bar may thus pivot upon the vertically arranged pin 16 and occupy any necessary position during the time of the backing operation. When the trailer is drawn forwardly then it may be desired to permit the draw bar to steer the wheels 11 in which event the draw bar is again made rigid and the pivoted head 13 unlocked from its rigid connection with the framework 10. The draw bar 15 consists of the two sections 17 and 18 which are pivotally connected together by the bolt 16. The section 18 has a pin 19 which engages the tongue structure 20 forming part of the pivoted structure 13. The section 18 likewise has arms 21, 22 which engage the pin 19 at their extremities, the extremities of these arms 21, 22 abutting the face plate 23' of the pivoted head structure 13. It will thus be seen that when the section 18 is connected in place upon the pivoted head structure 13 that a pivoting action between the section 18 and the head structure 13 about a horizontal axis is permitted, but no pivoting about a vertical axis. The tongue structure 20 however is of such a character that it can also receive and hold in place the eye 23 which forms the extremity of the draw bar section 17. The sections 17 and 18 are rigid whenever the bolt 24 is in the position shown in Figs. 2 and 3. This bolt is normally impelled into its locking position by the spring 25. The bolt is suitably carried, as shown more clearly in Fig. 4, and is fastened at its right hand extremity by the pin 26 to a finger piece 27. This finger piece, as more clearly shown in Fig. 6, is for the most part circular in outline, but has a portion cut-away so that it may pass without obstruction beyond the protruding angle 28.

Whenever it is desired to unlock the sections 17 and 18 the finger piece 27 is drawn to the right (Fig. 4) and rotated so that the overhanging portion of the finger piece 27 rests against the right hand face of the angle 28. The draw bar section 17 may then pivot upon the draw bar section 18 by reason of the pin 16. The section 17 of the draw bar carries the connecting eye 23 which is fastened to the stem 29, this stem having enlarged portions 30 and 31 abutting the loosely carried washers 32 and 33 respectively. Between the washers 32 and 33 a spring 34 is mounted so that the eye 23 may yield in two directions of movement relatively to the movement of the draw bar section 17. This double acting feature is of value for the reason that the draw bar is to be used both when the trailer is to be drawn forward and when it is to be backed up. It will thus be apparent that when the draw bar is in the condition shown in Figs. 2 and 3, that is, with its sections 17 and 18 locked together and is then mounted upon the rotating head structure 13, that this head structure will be rotated due to any swinging motion of the draw bar section 17, as shown more clearly in Fig. 1. As before stated, the draw bar may pivot about a vertical axis relative to the head structure 13 under these conditions. Under these conditions, likewise, it is of course necessary that the locking structure 14 be unlocked to permit the head structure 13 to pivot relatively to the trailer structure 10.

Now should it be desired to back up the trailer 10, then the pivoted head structure 13 is locked in its central position by the pin locking structure 14 and the bolt 25 is placed in its unlocking position so that the draw bar section 17 may pivot upon the pin 16, as more clearly shown in Fig. 1 at 15$^a$. Under this condition of things the section 17 pivots about a vertical axis, namely that provided by the pin 16, and the structure 18 pivots about a horizontal axis, namely that provided by the pin 19. The requisite flexibility of movement between the forward vehicle and the trailer is thus provided during the backing operation. This same flexibility is of value when the trailer is being drawn under those conditions when it is not necessary to have the draw bar steer the wheels 11.

From what has been described the nature of my invention will be apparent to those skilled in the art and it will also be apparent that many modifications may be made without departing from the spirit of the invention. Having however thus described one form which my invention may take, what I claim as new and desire to secure by Letters Patent is:

1. A draw bar of the character described comprising a short supporting section adapted to be pivotally and detachably secured to the draw bar head of a vehicle by means of a horizontal pivot and a long swinging section pivotally mounted upon said short section by means of a vertical pivot passing through the extremity of said long section and locking means on said long section coöperating with the extremity of said short section to lock said sections together to prevent their relative swinging movement.

2. A draw bar of the character described comprising a short supporting section adapted to be pivotally and detachably secured to the draw bar head of a vehicle by means of a horizontal pivot and a long swinging section pivotally mounted upon said short section by means of a vertical pivot passing through the extremity of said long section and locking means on said long section coöperating with a recess in the extremity of said short section to lock said sections together to prevent their relative swinging movement.

3. A readily removable draw bar of the character described comprising a section adapted to be detachably secured to the draw bar head of a vehicle to be drawn, a second section pivoted at one end thereof to said first section, and means confined within and longitudinally slidable on the second section to maintain said second section in rigid relation with the first section.

4. A readily removable draw bar of the character described comprising a section adapted to be detachably secured to the draw bar head of a vehicle to be drawn, a second section pivoted at one end thereof to said first section, and means confined within and longitudinally slidable on the second section to maintain said second section in rigid relation with the first section, and means to retain said longitudinally slidable means in inoperative position.

5. A draw bar of the character described comprising a short supporting section adapted to be pivotally and detachably secured to the draw bar head of a vehicle by means of a horizontal pivot and a long swinging section pivotally mounted upon said short section by means of a vertical pivot passing through the extremity of said long section and locking means on said long section coöperating with the extremity of said short section to lock said sections together to prevent their relative swinging movement, said long section having means at its other extremity to secure the same to a draw bar head, and said short section having means associated with its free extremity to prevent swinging of said draw bar on a vertical axis relative to said draw bar head.

6. A draw bar of the character described comprising a short supporting section adapted to be pivotally and detachably secured to the draw bar head of a vehicle by means of a horizontal pivot and a long swinging section pivotally mounted upon said short section by means of a vertical pivot passing through the extremity of said long section and locking means confined within said long section coöperating with the extremity of said short section to lock said sections together to prevent their relative swinging movement.

7. A draw bar of the character described comprising a short supporting section adapted to be pivotally and detachably secured to the draw bar head of a vehicle by means of a horizontal pivot and a long swinging section pivotally mounted upon said short section intermediate the ends thereof by means of a vertical pivot passing through the extremity of said long section and locking means on said long section spaced from the end thereof and coöperating with the extremity of said short section to lock said sections together to prevent their relative swinging movement.

8. A draw bar of the character described comprising a short supporting section adapted to be pivotally and detachably secured to the draw bar head of a vehicle by means of a horizontal pivot and a long swinging section pivotally mounted upon said short section intermediate the ends thereof by means of a vertical pivot passing through the extremity of said long section and locking means on said long section spaced from the end thereof and coöperating with a recess in the extremity of said short section to lock said sections together to prevent their relative swinging movement.

9. A draw bar of the character described comprising a short supporting section adapted to be pivotally and detachably secured to the draw bar head of a vehicle by means of a horizontal pivot and a long swinging section pivotally mounted upon said short section intermediate the ends thereof by means of a vertical pivot passing through the extremity of said long section and a longitudinally slidable locking bolt confined within said long section spaced from the end thereof and coöperating with the extremity of said short section to lock said sections together to prevent their relative swinging movement.

10. A draw bar of the character described comprising a short supporting section adapted to be pivotally and detachably secured to the draw bar head of a vehicle by means of a horizontal pivot and a long swinging section pivotally mounted upon said short section intermediate the ends thereof by means of a vertical pivot passing through the extremity of said long section and a longitudinally slidable locking bolt confined within said long section spaced from the end thereof and coöperating with the extremity of said short section to lock said sections together to prevent their relative swinging movement, said locking means and said long section being provided with means coöperating to hold said locking means in inoperative position.

11. A draw bar of the character described comprising a short supporting section adapted to be pivotally and detachably secured to the draw bar head of a vehicle by means of a horizontal pivot and a long swinging section pivotally mounted upon said short section intermediate the ends thereof by means of a vertical pivot passing through the extremity of said long section and a longitudinally slidable locking bolt confined within said long section spaced from the end thereof and coöperating with the extremity of said short section to lock said sections together to prevent their relative swinging movement, said locking means and said long section being provided with means coöperating to hold said locking means in inoperative position, the means on said long section being in the form of a stop which a portion of said bolt is adapted to engage.

12. A draw bar of the character described comprising a short supporting section adapted to be pivotally and detachably secured to the draw bar head of a vehicle by means of a horizontal pivot and a long swinging section pivotally mounted upon said short section intermediate the ends thereof by means of a vertical pivot passing through the extremity of said long section, locking means on said long section spaced from the end thereof and coöperating with the extremity of said short section to lock said sections together to prevent their relative swinging movement, and means for holding said locking means in inoperative position.

In witness whereof, I hereunto subscribe my name this 31st day of March, A. D. 1919.

ALBERT PRESTON LEE.